United States Patent [19]
Kanai et al.

[11] 3,865,100
[45] Feb. 11, 1975

[54] APPARATUS FOR MEASURING BLOOD PRESSURE

[75] Inventors: Hiroshi Kanai, Tokyo; Yuji Kimura, Kawasaki, both of Japan

[73] Assignees: Hiroshi Kanai, Kanagawa; Yuji Kimura, Tokyo, both of, Japan

[22] Filed: Apr. 19, 1973

[21] Appl. No.: 352,828

[52] U.S. Cl. .............................. 128/2.05 D, 73/392
[51] Int. Cl. ..................................... A61b 5/02
[58] Field of Search...... 128/2.05 D, 2.05 P, 2.05 T, 128/2 R; 73/392, 406

[56] References Cited
UNITED STATES PATENTS

| | | | |
|---|---|---|---|
| 1,803,255 | 4/1931 | Hopkins | 73/392 |
| 2,648,328 | 8/1953 | Hathaway et al. | 128/2.05 D |
| 3,496,776 | 2/1970 | Mistarz | 73/392 |
| 3,499,434 | 3/1970 | Ullrich et al. | 128/2.05 D |
| 3,565,056 | 2/1971 | Statham | 128/2 R |
| 3,608,436 | 9/1971 | Ostroot et al. | 73/392 X |
| 3,610,228 | 10/1971 | Temkin | 128/2.05 D |
| 3,631,850 | 1/1972 | Levasseur | 128/2.05 D |

FOREIGN PATENTS OR APPLICATIONS

| | | | |
|---|---|---|---|
| 554,522 | 7/1943 | Great Britain | 73/392 |
| 354,807 | 6/1922 | Germany | 73/392 |

OTHER PUBLICATIONS
Bio-Med. Engineering, (G.B.), Vol. 7, No. 7, (Aug., 1972) pp. 309–312.

*Primary Examiner*—Kyle L. Howell
*Attorney, Agent, or Firm*—Silverman & Cass, Ltd.

[57] ABSTRACT

An open distal end of a catheter is designed for insertion into a blood vessel of a patient. The catheter extends from the patient to a hollow housing that is divided into first and second chambers by a diaphragm. Before insertion, the catheter and the first chamber are filled with a physiological saline solution such that upon insertion, the patient's pulse is transmitted via the solution to and deflects the diaphragm. Although the patient's pulse is in the form of a generally square pressure wave, it has been observed that after transmission through the solution to the diaphragm, an undesirable oscillating wave is superimposed on the generally square pressure wave. In one embodiment of the invention, a generally dumbbell-shaped damping device is received in the first chamber for damping the oscillation wave so that only the square pressure wave is applied to the diaphragm for sensing by a transducer that operates a blood pressure indicator. In a preferred embodiment, the device is received in the second chamber behind the diaphragm for damping the oscillating wave without complicating the sterilization of the first chamber or interfering with the removal of air bubbles from the solution prior to insertion of the catheter.

5 Claims, 6 Drawing Figures

APPARATUS FOR MEASURING BLOOD PRESSURE

FIELD OF THE INVENTION

The present invention relates to apparatus for measuring blood pressure and more particularly to a transducer responsive to fluid pressure waves indicative of a patient's pulse, wherein the transducer is provided with a damping device for removing undesired oscillating waves from the pressure waves to more accurately indicate the patient's blood pressure.

BACKGROUND OF THE INVENTION

In the past, fluid filled catheters have been connected to transducers for producing an electrical signal indicative of a patient's blood pressure. One such cather having an open distal end is connected to a hollow transducer chamber and both are filled with a physiological saline solution. Such transducer does not, however, include facilities for damping selected waves transmitted thereto via the saline solution.

Research conducted in an endeavor to improve the accuracy of blood pressure measurements indicates that after transmission through the saline solution the patient's pulse appears at the transducer in the form of a desired generally square pressure wave having an undesired oscillating wave superimposed thereon. As a result, it has now been recognized that the accuracy of blood pressure measurements can be improved by damping the undesirable oscillating wave so that the transducer responds primarily to the desired square pressure wave.

Accordingly, an object of the present invention is to provide a new and improved apparatus for measuring blood pressure.

Another object of the present invention resides in the provision of facilities for measuring blood pressure in which spurious oscillating waves forming a part of a wave transmitted in response to a patient's pulse are removed to provide an indication of only a desired portion of such wave.

A further object of this invention is to provide in combination with a fluid wave responsive diaphragm, a device for damping oscillating waves that are superimposed on the fluid wave.

A still further object of the present invention resides in the provision of a generally dumbbell-shaped, fluid filled damping device in communication with a diaphragm that is responsive to selected portions of waves generated by a patient's pulse to facilitate more accurate indication of a patient's blood pressure.

SUMMARY OF THE INVENTION

With these and other objects of the present invention in view, the present invention contemplates a catheter having an open distal end for percutaneous insertion into a body region, such as a blood vessel, where blood pressure measurements are desired to be taken. The proximal end of the catheter terminates in a hollow, generally cylindrical housing that is divided into first and second chambers by a diaphragm operably connected to a transducer that operates a blood pressure indicator. In one embodiment of the invention, a generally dumbbell-shaped damping device is received in the first chamber of the housing, whereas in the preferred embodiment the device is received in the second chamber to facilitate sterilization of the first chamber. Before insertion of the distal end of the catheter in the blood vessel, physiological saline solution is introduced into the first chamber of the housing and the catheter. The catheter is then inserted into the blood vessel such that changes in the pressure of the blood are transmitted through the saline solution to the diaphragm of the second embodiment in the form of a generally square pressure wave having an undesired oscillating wave superimposed thereon. The damping device is effective to damp the oscillating wave so that the transducer causes the indicator to produce an output that accurately represents the patient's blood pressure.

DESCRIPTION OF PRIOR ART

Figure 1:
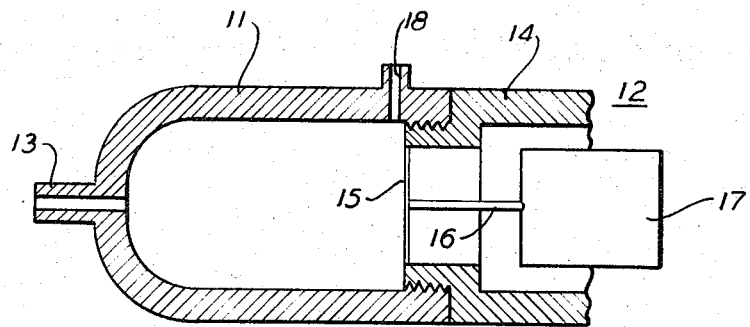
FIG. 1 is a cross-sectional view of a prior art blood pressure measuring apparatus.
Figure 2:
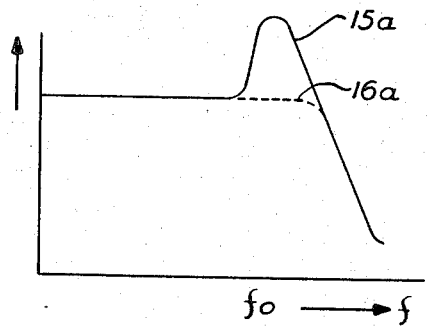
FIG. 2 is a graph of the frequency characteristic of the prior art apparatus shown in FIG. 1
Figure 3:
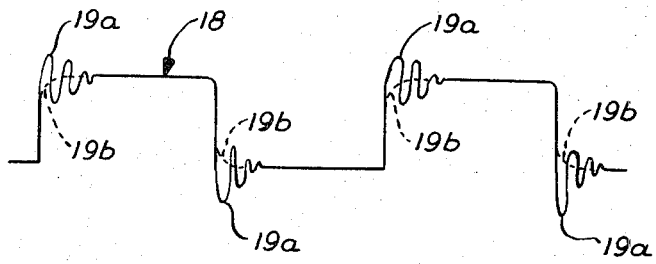
FIG. 3 is a graph of the amplitude of a wave sensed by the prior art apparatus as a function of time, showing a spurious oscillating wave superimposed on a generally square, desired wave that is indicative of a patient's blood pressure.

Referring to FIG. 1, prior art apparatus is shown including a detector 12 connected at the right end of a cylindrical container 11 arranged with a connection 13 capable of attachment to a blood vessel, such as a vein and equipped with an injection syringe or catheter (not shown). At the detector 12 a membrane 15 made of stainless steel for the conversion of blood pulsation or waves is joined to the right or inner end of a cylindrical tube 14 which is connected to the right open end of the container 11. The center of the membrane 15 is connected to the detector 12 through a connecting rod or tube 16. A strain gauge 17 may be employed as the detector 12. A physiological saline solution may be fed into the container 11 via an opening 18 and an opening (not shown) adjacent to the opening 18 may be used to eliminate air bubbles that may form in the solution within the container 11. The catheter is then inserted into the vein so that the blood pulsations to be measured are transmitted to the membrane 15 through the connection 13 and the left side of the container 11. Movement of the membrane 15 causes the connecting rod 16 to operate the detector 17 so that it produces an electrical signal. However, the range of Q in the apparatus shown in FIG. 1 is between 4 to 7 and the frequency characteristic has a resonance in a range between 25 and 30Hz as shown in FIG. 2, depending to some degree on the internal diameter of the container 11. Due to this fact, the wave 18 sensed by the transducer 17 does not accurately reflect the pressure of the blood because such wave 18 includes oscillating waves 19a shown in FIG. 3.

DESCRIPTION OF THE PRESENT INVENTION

Figure 4:
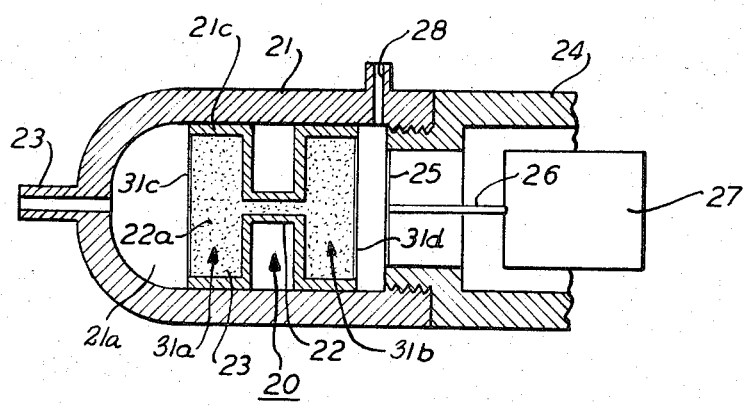
FIG. 4 is a cross-sectional view of a first embodiment of the present invention showing a device for damping the spurious wave.

In order to overcome this problem, the present invention contemplates apparatus capable of more accurately representing the pulsation of the blood, and therefore blood pressure. Referring to FIG. 4, there is shown a damping device 20 in operative engagement with physiological saline solution in a housing 21 for changing the frequency characteristic of the system shown in FIG. 4 so that the oscillating waves 19a are damped such that the wave 18 sensed by a transducer 27 includes portions 19b shown by the dashed lines in FIG. 3 instead of the oscillating waves 19a.

Still referring to FIG. 4, the damping device 20 is shown mounted in a left side 21a of the housing 21. The damping device 20 has a generally dumbbell shape and includes two cavities 31a and 31b that are connected for fluid communication therebetween via a damping tube or capillary 22. The damping device 20 is filled with damping fluid 22a, such as silicone oil. Walls 21c of the device 20 are of sufficient thickness to remain in the shape shown whereas a side 31c of the damping device 20 is capable of transmitting the sensed wave 18 to the fluid 22a and a side 31d is capable of transmitting the damped wave to the saline solution adjacent to and for response by a thin diaphragm 25 that may be constructed of metal or plastic.

A catheter (not shown) is attached to an open end 23 of the housing 21 and the catheter and the space in the left side 21a around the device 20 are filled with the physiological saline solution so that upon insertion of the catheter into the blood vessel, the changes in the pressure of the patient's blood pressure are transmitted through the solution in the catheter to the damping device 20. The device 20 is effective to damp the oscillating wave 19a so that the sensed wave 18 is applied to the diaphragm 25 in the form of the wave 18 having the portions 19b rather than 19a. The diaphragm 25 operates the transducer 27 by moving a connecting rod 26.

Although the damping device shown in FIG. 4 enables the transducer to more accurately measure blood pressure, there is a disadvantage because, in general, this kind of device requires the sterilization of the parts within the left side 21a of the housing 21 and the complete elimination of bubbles which develop in the left side 21a and in the catheter before the saline solution and the catheter are introduced into the body.

The task of eliminating bubbles usually requires much effort and it is not easily accomplished owing to the installation of the device 20 in the side 21a of the housing 21.

Also, the effect of generating considerable pressure in the housing 21 for the purpose of complete bubble elimination may damage the thin membrane 25 which is in contact with the saline physiological solution.

Figure 6:
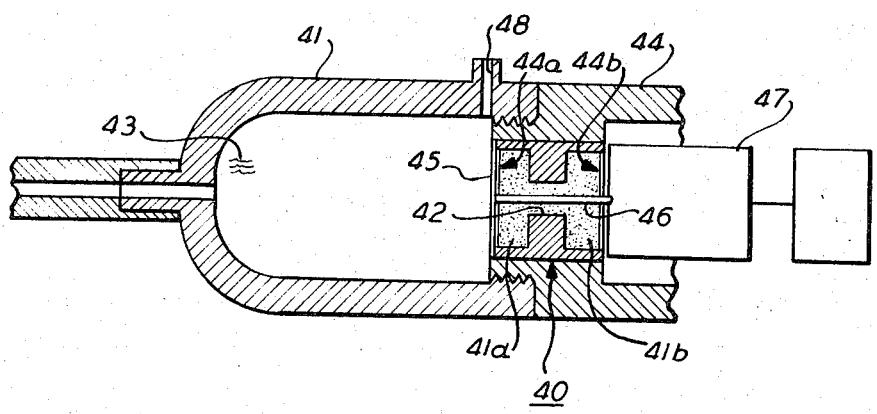
FIG. 6 is a cross-sectional view of a preferred embodiment of the present invention in which the device shown in FIG. 5 is mounted in a second chamber of a housing.

In order to eliminate these abovementioned disadvantages, a damping device 40 according to this invention is inserted between a membrane 45 and the transducer 27 as shown in FIG. 6.

The damping device 40 is equipped with a damping tube 42 with a relatively large diameter and is provided with cavities 41a and 41b at both sides. A membrane 44a to the left and a membrane 44b to the right close the cavities 41 and 41b and are penetrated by a connecting tube or rod 46 installed between the membrane 45 and a transducer 47. Because the damping tube 42 is penetrated by the connecting tube 46 a relatively large internal diameter is provided for the damping tube 42.

In this case, the damping liquid 43 has a viscosity greater in comparison with the saline physiological solution owing to the larger internal diameter of the damping tube 42, and a liquid such as silicone oil which has approximately the same density as the saline physiological solution. is employed.

Figure 5:
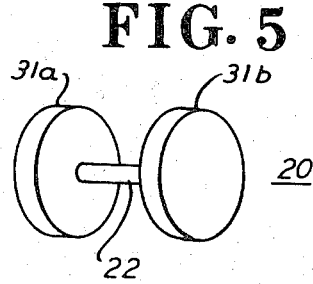
FIG. 5 is a perspective view of the device shown in FIG. 4

The housing 41 and a tube 44 may be constructed similar to the corresponding parts 21 and 24 shown in FIG. 4. Also, it is to be understood that the size of the O.D. of the damping tube 42 can be as large as that of the cavities 41a and 41b, and shapes can be selected as illustrated in FIG. 5 to produce the same function. For example, the damping device 40 might be installed to have a junction in contact wtih the inner walls of the tube 44.

This arrangement of the damping device 40 enables the blood pulsation to be transmitted to the membrane 45 in accordance with the principles of the present invention as mentioned above so that the oscillating wave may be suitably damped enabling the recorded wave 18 to be in the form of a curve including the dashed line 19b rather than the solid line 19a which results in more accurate representation of the patient's blood pressure.

According to the above mentioned construction of this invention, the damping device 40 is installed to the right of the membrane 45 so that the work of sterilization and bubble elimination can be accomplished effectively without difficultly and with accuracy.

Further, if relatively high pressure is produced for the purpose of bubble elimination, this damping device 40 cannot be damaged and long life in operation may be anticipated with its use.

To offer a practical example, the left membrane 44a adjacent to cavity 41a may be employed to serve as the membrane 45, or the damping device 40 can be separated from the membrane 45 at a slight distance.

The shape of the damping device 40 is not limited to the type shown in FIG. 6 and a shape enclosing transducer 47 partially or wholly can be chosen. Similarly, the diameter of the damping tube 42 can be altered according to the kind of damping liquid used in the damping device.

It is to be understood that the description hereinabove is primarily directed to the damping devices 20 and 40 and to the relationship thereof to the respective housings 21 and 41 and diaphragms 25 and 45. Various methods and apparatus known to the art may be used for filling the housings with saline solution, providing communication from the port 28 to the connector 23 and for removing bubbles from the saline solution.

Although two embodiments of the present invention have been shown and described, it will be obvious to one skilled in the art that changes may be made without departing from the spirit of this invention in its broader aspects, and, therefore, the object of the appended claims is to cover all such changes as fall within the ture spirit and scope of this invention.

We claim:

1. An apparatus for measuring blood pressure comprising, a catheter having an open distal end which is to be inserted into a blood vessel of a patient and a proximal end;

a hollow housing to one end of which is connected said proximal end of the catheter;

the internal diameter of a greater portion of said housing being substantially greater than that of the catheter;

a substantially dumbbell-shaped damping member disposed in said hollow housing and having first and second cavities with first and second flexible diaphragms respectively and a tube connecting said first and second cavities, the internal diameter of said cavities being substantially equal to that of said hollow housing and the internal diameter of said tube being smaller than that of said cavities inside of said damping member, said damping member being filled with damping liquid having a viscosity greater than that of a physiological saline solution filled in said catheter and a space formed by an inner surface of said hollow housing and said first diaphragm of said first cavity;

a pressure transducing means provided behind said second cavity of said damping member viewed from the catheter and responsive to blood pressure variations through a body of physiological saline solution filled in said catheter and said space in said housing and said damping member to produce an output representative of said blood pressure variations; and an indicator means connected to said pressure transducing device for indicating said blood pressure variations.

2. An apparatus for measuring blood pressure according to claim 1, wherein said hollow housing is composed of first and second portions, said first portion having said open end connected to said proximal end of said catheter, between said first and second housing portions is arranged a flexible diaphragm, said substantially dumbbell-shaped damping member is provided in a space formed by said first housing portion and said diaphragm and at least a portion of said pressure transducing member is provided in a space formed by said second housing portion and said diaphragm so as to be responsive to vibrations of said diaphragm which are caused by the blood pressure variations transmitted to said diaphragm through a body of physiological saline solution filled in said catheter and said space within said first housing portion and said damping member.

3. An apparatus for measuring blood pressure according to claim 1, wherein said pressure transducing device has a rod which extends through said second cavity and said tube of said damping member to said diaphragm of said first cavity and is secured thereto.

4. An apparatus for measuring blood pressure according to claim 1, wherein said pressure transducing device comprises a rod which extends to said diaphragm of said second cavity of said damping member and is secured thereto.

5. An apparatus for measuring blood pressure according to claim 1, wherein said damping liquid filled in said damping member is silicone oil.

* * * * *